United States Patent
Combellas et al.

(10) Patent No.: US 8,133,379 B2
(45) Date of Patent: Mar. 13, 2012

(54) METHOD FOR ELECTROCHEMICALLY REALIZING A HYDROPHILIC AREA ON A HYDROPHOBIC SUBSTRATE

(75) Inventors: Catherine Combellas, Paris (FR);
Frédéric Kanoufi, Vincennes (FR);
Adrien Fuchs, Paris (FR)

(73) Assignee: Centre National de la Recherche Scientifique, Paris (FR)

( * ) Notice: Subject to any disclaimer, the term of this patent is extended or adjusted under 35 U.S.C. 154(b) by 734 days.

(21) Appl. No.: 11/921,566

(22) PCT Filed: Jun. 6, 2006

(86) PCT No.: PCT/FR2006/001270
§ 371 (c)(1),
(2), (4) Date: Dec. 12, 2008

(87) PCT Pub. No.: WO2006/131633
PCT Pub. Date: Dec. 14, 2006

(65) Prior Publication Data
US 2009/0101508 A1    Apr. 23, 2009

(30) Foreign Application Priority Data
Jun. 6, 2005    (FR) ...................... 05 05704

(51) Int. Cl.
*B05D 3/14* (2006.01)
*C25F 5/00* (2006.01)

(52) U.S. Cl. .......................... 205/688; 205/118; 427/444

(58) Field of Classification Search .................. 205/118, 205/688; 427/444
See application file for complete search history.

(56) References Cited

U.S. PATENT DOCUMENTS

| 4,661,383 | A | * | 4/1987 | Elsenbaumer et al. | ........ 427/302 |
| 4,707,230 | A | * | 11/1987 | Ajami | ........................... 588/303 |
| 5,374,454 | A | * | 12/1994 | Bickford et al. | .............. 427/306 |
| 5,800,858 | A | * | 9/1998 | Bickford et al. | ............. 427/97.9 |
| 6,221,227 | B1 | | 4/2001 | Lin et al. | |

OTHER PUBLICATIONS

Brewis, D. M. et al, Die Angewandte Makromolekulare Chemie 1975, 43, 191-194.*
Combellas, C. et al, Journal of Applied Electrochemistry 1991, 21, 267-275.*
Brace, K. et al, Polymer 1997, 38, 3295-3305.*
Amatore, C. et al, Chemistry European Journal 2000, 6, 820-835.*
Combellas, C. et al, Journal of Electroanalytical Chemistry 2001, 499, 144-151.*
Kanoufi, F. et al, Langmuir 2003, 19, 6711-6716.*
Combellas, C. et al, Analytical Chemistry 2004, 76, 3612-3618.*
Vincent Boittiaux et al., "Surface modification of halogenated polymers 3. Influence of additives such as alkali cations or nucleophiles on the magnesium reductive treatment of polytetrafluoroethylene", Polymer vol. 40 (1999) pp. 2011-2026.

(Continued)

*Primary Examiner* — Arlen Soderquist
(74) *Attorney, Agent, or Firm* — Merchant & Gould

(57) ABSTRACT

The invention relates to a method for producing at least one hydrophilic area on a hydrophobic substrate. The method consists in performing an electrochemical reduction of the surface under the following conditions:
  the reduction is performed in an electrochemical cell which contains an electrolytic solution containing a compound that is a precursor of a reducing agent, said compound having a standard potential of less than −2.7 V relative to the saturated calomel electrode (SCE);
  the reducing electrode is placed relative to the substrate surface to be treated such that said surface is facing the surface of the electrode, which is the image of the area to be reduced;
  the reducing electrode is subjected to the formation potential of the reducing agent.

18 Claims, 2 Drawing Sheets

OTHER PUBLICATIONS

Catherine Combellas et al., "Surface modification of halogenated polymers 4. Functionalisation of poly (tetrafluoroethylene) surfaces by diazonium salts", Polymer vol. 44 (2003) pp. 19-24.

Catherine Combellas et al., "Surface modification of halogenated polymers. 6. Graft copolymerization of poly (tetrafluoroethylene) surfaces by polyacrylic acid", Polymer vol. 45 (2004) pp. 4669-4675.

* cited by examiner

METHOD FOR ELECTROCHEMICALLY REALIZING A HYDROPHILIC AREA ON A HYDROPHOBIC SUBSTRATE

The invention relates to a method for producing at least one hydrophilic area on a surface of a hydrophobic substrate.

BACKGROUND OF THE INVENTION

In particular, the method according to the invention makes use of a technique for localized electrochemical reduction so as to form, on the surface of a piece, hydrophilic areas surrounded by hydrophobic areas.

The pieces made of composite material comprising such localized hydrophilic areas are intended to be used in particular for producing spots capable of chemical recognition, such as biochips (also called DNA chips), or in the field of microfluidics, which relates to flows in structures involving characteristic sizes of the order of a micrometer, in order to obtain fluid or particle transport areas (biological cells).

In fact, for such applications, it is necessary for the hydrophilic part of the substrate, or active part, to be localized, and for the rest of the substrate to be chemically and physically inert, so as not to influence the reactions taking place in the active part.

For the applications under consideration, the use of substrates made of polymer material has recently developed. In fact, these substrates offer, compared with the silicon or the glass conventionally used, many advantages such as ready formulation, a low cost and good biocompatibility.

A process for the fabrication of microstructures having geometrically diverse configurations, in a piece comprising superimposed layers of various polymers, is known, for example, from document U.S. Pat. No. 6,221,227. However, this process comprises a large number of steps, which makes its implementation complex.

The local modification of substrates made of polytetrafluoroethylene, or PTFE (generally sold under the trademark Teflon®) by electrochemical reduction is, moreover, known. Reference may be made to the following publications: C. Combellas et al., *Polymer* 44 (2003) 19-24; C. Combellas et al., *Polymer* 45 (2004) 4669-4675; C. Combellas et al., *J. Phys. Chem. B* (2004), 108, 6391-6397.

The use of the electrochemical process makes it possible to readily adjust the sizes of the hydrophilic areas through the selection of the electrode used, allows easy large-scale transposition, and is also inexpensive. Moreover, PTFE provides the advantage of good thermal resistance and a low cost.

However, this polymer has drawbacks that are extremely detrimental for the applications under consideration. In fact, it has a poor surface finish, in particular a rough character which cannot be improved, even by polishing. In addition, it exhibits creep from 60° C. onward, and is opaque.

SUMMARY OF THE INVENTION

In order to remedy these drawbacks, the inventors propose using, as hydrophobic substrate, a chemically inert material, one surface of which is coated with a thin hydrophobic film. The film is formed from fluorinated organic groups. The inventors have determined a group of compounds which are reducing agents sufficiently powerful to reduce the hydrophobic surface of such substrates, and which make it possible to carry out a localized reduction.

BRIEF DESCRIPTION OF THE DRAWINGS

Other subjects and advantages of the invention will emerge in the course of the description which follows, which is given with reference to the attached drawings in which.

DETAILED DESCRIPTION OF THE PREFERRED EMBODIMENTS

Figure 1A:
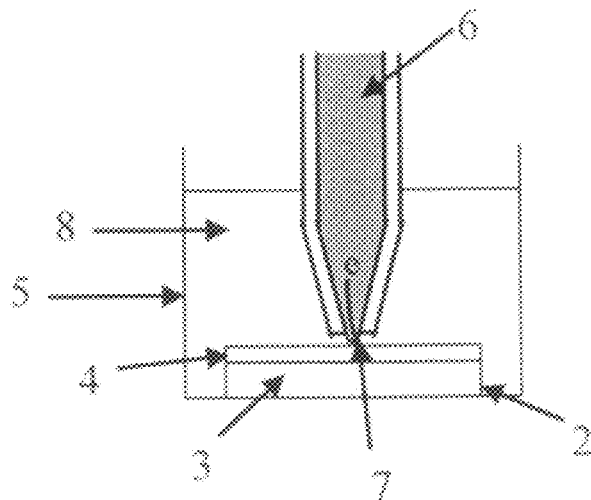
FIGS. 1a and 1b are schematic sectional views of an electrochemical cell in which the method according to the invention is carried out, respectively immediately before and immediately after reduction, the reducing electrode being, during the reduction, in direct contact with the substrate surface to be treated.

To this effect, according to a first aspect, the invention proposes a method for producing at least one hydrophilic area on a substrate which consists of a chemically inert material and of which one surface to be treated is coated with a hydrophobic film, said hydrophobic film consisting of fluorinated organic groups, said method consisting in performing an electrochemical reduction of the surface to be treated, and in which:

the reduction is performed in an electrochemical cell which is equipped with a reducing electrode and a counterelectrode, and which contains an electrolytic solution containing at least one solvent and a compound that is a precursor of a reducing agent, said compound being chosen so as to have a standard potential of less than −2.7 V relative to the saturated calomel electrode (SCE);

the reducing electrode is placed, in relation to the surface of the substrate, such that said surface is facing the usable surface of the electrode, said surface of the electrode being the image of the area to be reduced;

the reducing electrode is subjected to the formation potential of the reducing agent.

The "usable surface of the electrode" is intended to mean the portion of the surface of contact between the electrode and the electrolytic solution on which the generation of the reducing agent takes place.

This method combines the use of specific compounds capable of forming highly reducing agents in solution and the use of an electrode with a geometry suitable for the area to be reduced. It is thus possible to obtain, in a controlled, precise and readily adjustable manner, a hydrophilic area devoid of fluorine, the geometry of which is chosen according to the application under consideration.

The hydrophilic area(s) obtained is (are) well localized, since the reducing agent is generated in the immediate vicinity of the electrode. These hydrophilic areas are surrounded by a hydrophobic material which is not only long-lasting, but also chemically and physically inert. This modified hydrophobic substrate has, in particular, excellent surface qualities.

According to one embodiment, the compound that is a precursor of the reducing agent corresponds to the general formula $P(R^1R^2R^3)$, in which at least one of the substituents $R^1$, $R^2$ and $R^3$ represents a phenyl group bearing from 1 to 3 substituents, among which mention may be made of optionally substituted, linear or branched alkyl groups containing from 1 to 6 carbon atoms. Preferably, $R^1$, $R^2$ and $R^3$ represent, independently of one another, a phenyl group bearing from 1 to 3 methyl groups. In particular, the compound that is a precursor of the reducing agent is tritolylphosphine.

According to this embodiment, the precursor compound can be reduced to an anion radical Rad$^{\cdot-}$ which induces the reduction.

The electrolytic solution preferably comprises:
a solvent chosen from the group consisting of dimethylformamide (DMF), dimethyl sulfoxide (DMSO), hexamethylphosphorotriamide (HMPT), hexamethylphosphoramide (HMPA), a nitrile such as acetonitrile, tetrahydrofuran (THF), ammonia and primary amines;
a salt of M$^+$A$^-$ type in which M$^+$ is a nonreducible cation chosen from the group consisting of Li$^+$, Na$^+$, K$^+$ and NR$_4^+$, R being an alkyl radical, and in which A$^-$ is a nonreducible anion chosen from the group consisting of BF$_4^-$, B(C$_6$H$_5$)$_4^-$, CF$_3$CO$_2^-$, PF$_6^-$, (EtO)$_2$PO$^-$, NCCHCO$_2$Et$^-$, AcO$^-$, SCN$^-$, CH$_3$CH$_2$CH$_2$CH(NH$_2$)CO$_2^-$, ClO$_4^-$, Br$^-$, Cl$^-$, I$^-$ and SO$_4^{2-}$.

According to another embodiment, the compound that is a precursor of the reducing agent is a metal cation chosen from the group comprising the cations originating from the alkali metals, the alkaline earth metals, magnesium and aluminum, said metal cation being capable of inducing the formation of solvated electrons which bring about the reduction. In this case, the electrolytic solution preferably comprises a solvent chosen from the group consisting of ammonia, primary amines (such as methylamine, ethylamine, propylamine or ethylenediamine), hexamethylphosphoramide, an ammonia/THF mixture or a mixture of an amine and of THF.

The fluorinated organic groups forming the hydrophobic film are preferably chosen from the group consisting of linear fluoroalkyl groups and branched fluoroalkyl groups, fluoroalkylthiol groups and fluorophenyl groups, and may be perfluoro groups. According to one embodiment, the F/H (fluorine atom/hydrogen atom) ratio is, before reduction, greater than or equal to 1.

The material forming the substrate is advantageously chosen from the group consisting of glass, silica, silicon, alumina, metal oxides, metals, or an insulating material, for example a polycarbonate, coated with a conductive or semiconductive film. In particular, the use of transparent materials such as glass makes it possible to use very varied, in particular optical, types of detection.

According to one embodiment, the surface of the reducing electrode facing the substrate surface to be treated is a continuous surface. This surface may be in the shape of a disk or a band, or alternatively a pad on which is inscribed the pattern to be etched, i.e. the pattern that it is desired to impose on the hydrophilic area.

According to another embodiment, the surface of the reducing electrode facing the substrate surface to be treated is a discontinuous surface. It may be made up of a plurality of spots, the end of the electrode thus having the shape of a brush.

When the electrode has a surface in the shape of a disk, it is preferable for the distance between this surface of the electrode and the substrate surface to be treated to be between 0 and 2 times the radius of the disk.

When the electrode has a surface in the shape of a band, it is preferable for the distance between this surface of the electrode and the substrate surface to be treated to be between 0 and 2 times the width of the band.

The method according to the invention consequently makes it possible to obtain a piece made of composite material consisting of a chemically inert material bearing on one of its faces a hydrophobic film interrupted with at least one hydrophilic area, at least one of the dimensions of which is micrometric.

This piece may comprise at least one hydrophilic area in the shape of a disk, the diameter of said area being less than or equal to 500 microns. Such a piece is obtained by using an electrode of "disk-electrode" type, the diameter of the disk being of the order of the diameter of the hydrophilic area obtained. As a variant, this piece may comprise a plurality of hydrophilic areas in the shape of a disk, the diameter of each area being less than or equal to 500 microns. This piece is obtained by using an electrode comprising multiple spots. These two types of pieces can be advantageously used for the preparation of biochips.

By carrying out the method according to the invention, it is also possible to obtain a piece comprising at least one hydrophilic area in the shape of a line, the length of said line being of the order of a few millimeters and the thickness of said line being less than or equal to 500 microns. Such a piece can advantageously be used to produce a microfluidic system which comprises, for example, at least one channel formed by said line. In fact, microfluidic systems such as reaction chambers, mixers or microchannels must be chemically inert, which is the case for pieces obtained by carrying out the method of the invention.

Figure 1B:
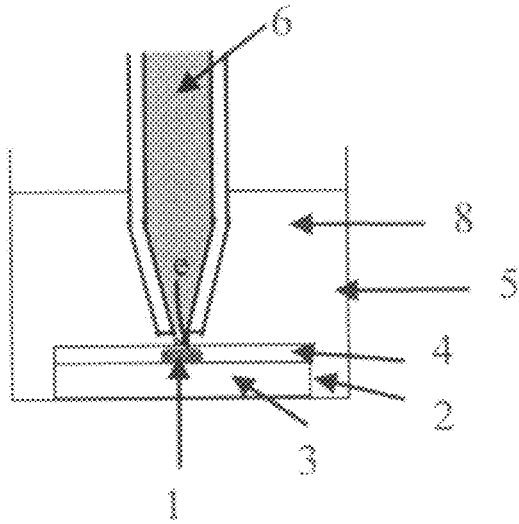
Figure 2A:
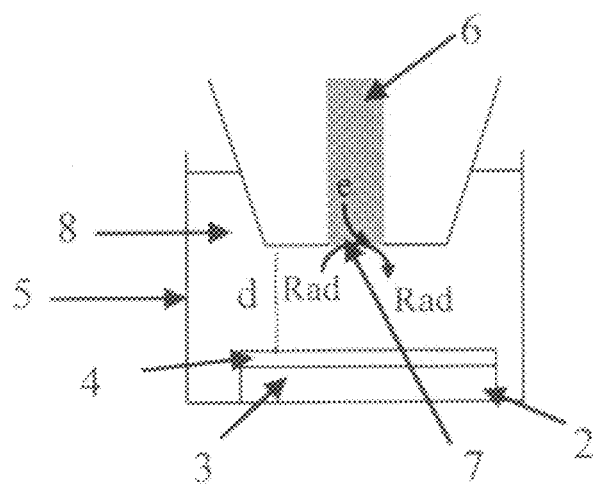
FIGS. 2a and 2b are views similar to FIG. 1, in which the reducing electrode is, during the reduction, located in the vicinity of the substrate surface to be treated.
Figure 2B:
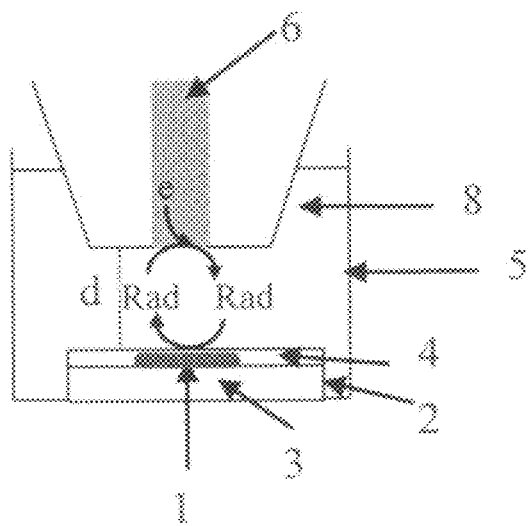
Figure 3:
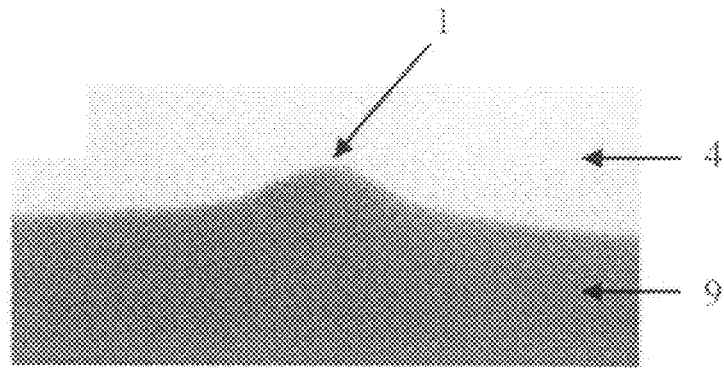
FIG. 3 is a photograph of a modified substrate, the surface of which has a hydrophilic line.
Figure 4:
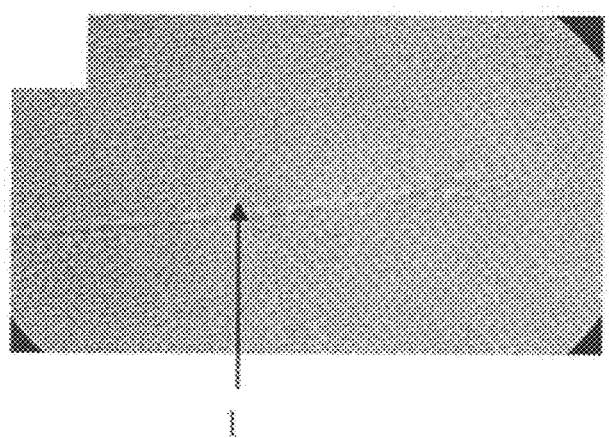
FIG. 4 is a photograph of a modified substrate, the surface of which has a hydrophilic line on which water has been condensed.
Figure 5:
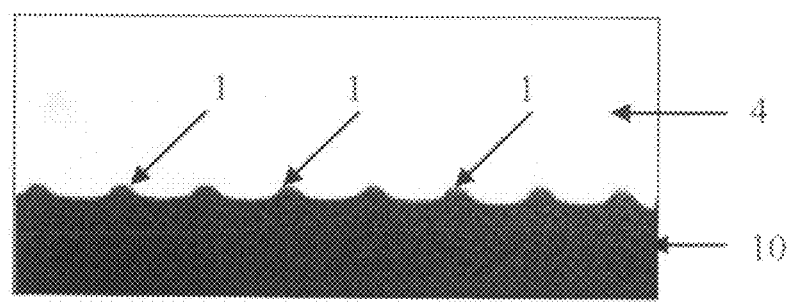
FIG. 5 is a photograph showing the spots obtained according to the protocol of example 1.1. The substrate is extracted vertically from a liquid (dark part of the photograph) which remains anchored on the spots.

Other subjects and advantages of the invention will emerge in the course of the description which follows, which is given with reference to the attached drawings in which:

FIGS. 1a and 1b are schematic sectional views of an electrochemical cell in which the method according to the invention is carried out, respectively immediately before and immediately after reduction, the reducing electrode being, during the reduction, in direct contact with the substrate surface to be treated;

FIGS. 2a and 2b are views similar to FIG. 1, in which the reducing electrode is, during the reduction, located in the vicinity of the substrate surface to be treated;

FIG. 3 is a photograph of a modified substrate, the surface of which has a hydrophilic line;

FIG. 4 is a photograph of a modified substrate, the surface of which has a hydrophilic line on which water has been condensed;

FIG. 5 is a photograph showing the spots obtained according to the protocol of example 1.1. The substrate is extracted vertically from a liquid (dark part of the photograph) which remains anchored on the spots.

The method according to the invention is intended to allow the formation of one or more hydrophilic areas 1 on a substrate 2. This substrate 2 consists of a chemically inert material 3, and has a surface 4 coated with a hydrophobic film which consists of fluorinated organic groups. This surface 4 is that on which it is desired to create the hydrophilic area(s) 1. In the rest of the description, this surface 4 will be referred to by the terms "surface to be treated".

The method consists of a localized electrochemical reduction of the surface to be treated 4, so as to reduce certain fluorinated organic groups located on a precise area.

This method is carried out in a conventional electrochemical cell 5. This cell 5 is equipped with a reducing electrode 6, or "working" electrode, a counterelectrode and, optionally, a reference electrode.

The reducing electrode 6 is typically a microelectrode, i.e. an electrode whose tip has a micrometric dimension. This microelectrode 6 is made of a metal that is nonreducible at the potentials under consideration, such as platinum, gold, tungsten or stainless steel.

The electrode 6 has a surface 7 that can have various shapes, according to the geometry of the hydrophilic area 1 that it is desired to obtain.

For example, an electrode 6 whose surface 7 is continuous can be used. This surface 7 can be in the shape of a disk or a band, which makes it possible to obtain on the substrate 2 a single hydrophilic area 1 in the shape of a disk or in the shape of a line, respectively. The surface 7 of the electrode 6 can also be a pad on which is inscribed the pattern to be etched, the pattern being the shape that it is desired to confer on the hydrophilic area 1 of the substrate 2.

It is also possible to use an electrode 6 whose surface 7 is discontinuous and, for example, made up of a plurality of points, so as to form on the substrate 2 a plurality of hydrophilic areas 1 in the shape of a disk.

The counterelectrode used (not represented) is made of a metal that is not readily oxidizable, such as platinum, gold, tungsten or stainless steel. It may be a wire or a grid, the size of which (the surface area in the case of a grid) is much greater than that of the reducing electrode 6.

For example, it is possible to use a reducing electrode 6 of disk type, having a radius a=25 μm, with a counter-electrode made of a platinum wire 1 mm in diameter and a few millimeters in length. Such a device makes it possible to work in the absence of a reference electrode.

The electrochemical reduction method is carried out under an inert atmosphere, i.e. in the absence of oxygen and of water.

In the cell, the reducing electrode 6 is placed, relative to the substrate 2, such that the surface to be treated 4 is facing the surface 7 of the electrode 6.

According to the embodiment represented in FIGS. 1a and 1b, the surface 7 of the electrode 6 is in contact with the surface to be treated 4.

According to the embodiment represented in FIGS. 2a and 2b, the surface 7 of the electrode 6 is placed in the vicinity of the surface to be treated 4, the expression "in the vicinity" here meaning at a micrometric distance.

To obtain the desired distance between the surface 7 of the electrode 6 and the surface to be treated 4, use is made of a suitable device for moving either the electrode 6 or the substrate 2 by a distance of a few micrometers, while at the same time adjusting the parallelism between the surface 7 of the electrode 6 and the surface to be treated 4. This type of device is described in the following publications: C. Combellas et al., *J. Phys. Chem., B* 108, 2004, 6391-6397, and C. Combellas et al., *Anal. Chem.* 76, 2004, 3612-3618.

In a variant, it is also possible to use an electrochemical cell 5 with a thin layer configuration, in which the electrode 6 and the substrate 2 are fixed, and are separated by a thin film (a few micrometers thick) of solvent. This technique allows a well-controlled approach and good reproducibility from one experiment to the other.

The distance (d) separating the surface 7 of the electrode 6 and the surface to be treated 4 can be evaluated by optical measurement, or using an electrochemical distance probe.

The electrolytic solution 8 which is introduced into the cell 5 fills at least the space between the surface 7 of the electrode 6 and the substrate 2. The counterelectrode and, where appropriate, the reference electrode are also in contact with the electrolytic solution 8.

This solution 8 contains an appropriate solvent and a compound that is a precursor of a reducing agent, the standard potential of which is below −2.7 Volts, relative to the SCE (saturated calomel electrode) reference system.

In order to perform the electrochemical reduction, the electrode 6 is subjected to the formation potential of the reducing agent, for the period of time necessary for the reduction of the area 1 of the substrate 2 facing the surface 7 of the electrode 6. This period of time is of the order of 10 to 100 seconds.

The submitting of the electrode 6 to such a potential makes it possible to convert the compound into the reducing agent, which is thus generated in situ, in the immediate vicinity of the surface 7 of the electrode 6. This agent brings about the reduction of the fluoro groups located on the area 1 facing the surface 7 of the electrode 6.

The reduction is reflected by cleavage of carbon-fluorine bonds, and results in the replacement of fluorine atoms with hydrogen atoms and/or in the appearance of double and/or triple carbon-carbon bonds which can subsequently be hydrolyzed. These new functionalities give the area 1 its hydrophilic nature.

The reduction mechanism is complex. It is shown that, in solution, fluorinated molecules ($C_6F_{14}$, $C_8F_{18}$, $C_{10}F_{22}$), identical to the terminal end of the molecules which are grafted onto the surfaces are also reduced by the reducing compound (solvated electron or anion radical of the precursor compound $P(R^1R^2R^3)$). The reduction results in defluorination of the molecules.

If the reducing agent is an anion radical $Rad.^-$, obtained by means of an electrode polarized at the reducing potential of Rad according to reaction (1):

the reduction of a C—F bond corresponds to reaction (2):

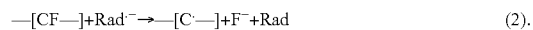

If the reducing agent is a solvated electron, the reduction of a C—F bond corresponds to reaction (3):

When the compound that is a precursor of the reducing agent is a compound capable of forming an anion radical $Rad.^-$, it is possible to fix either the potential or the current.

When the precursor compound is a metal cation that can induce in solution the formation of solvated electrons, fixing the current provides greater reproducibility.

When working at controlled potential, the value of the potential is fixed at a value that is of the order of 150-200 mV below that of the formation potential of the reducing agent. The current is then controlled by the transfer of material to the electrode 6.

When working at controlled current, the value of the current depends on the concentration of the reducing agent that it is desired to locally generate. This value also depends on the distance (d) between the electrode 6 and the surface to be treated 4, and the size (a) of the electrode.

For example, for a concentration of the compound that is a precursor of the reducing agent of 0.1 M, a disk electrode with a radius a=25 μm, and a distance d=0.7a=17 μm, a current of 400 nA must be applied.

After the reduction, the substrate 2 is recovered and rinsed. A substrate 2 whose surface 4 has a defluorinated hydrophilic area 1 is thus obtained. The dimensions of this hydrophilic area 1 are determined by the geometry of the surface 7 of the electrode 6, and are the image of this surface 7.

The method can be used for obtaining a microfluidic system, in the form of a piece, for example a plaque, comprising at least one hydrophilic line. The hydrophilic line(s) is (are) etched on the hydrophobic surface of the substrate by means of a band electrode or a pad on which is inscribed the pattern to be etched. The electrode may be in direct contact with the substrate, or it may be kept at a micrometric distance from said substrate.

According to the desired application, the channel formed by the hydrophilic line can be closed with a cover, or can be open, which allows ready interventions, for example for injections or the taking of samples.

Surface analysis of the lines can be carried out by secondary-ion mass spectrometry (ToF-SIMS), so as to qualitatively demonstrate the effect of the electrochemical reduction. A defluorination (positive ion spectrum) and a greater content of oxygen and hydroxyl groups (negative ion spectrum) are in fact observed on the line(s).

Moreover, two types of complementary approaches can be adopted for testing the confinement of a liquid on a reduced area of a hydrophobic substrate.

The first approach consists in immersing a sample, on which a hydrophilic line has been etched (see photograph of FIG. 3), virtually horizontally into a polar liquid. The distortion of the liquid front 9 indicates the presence of the hydrophilic line surrounded by the hydrophobic surface. The stretching of the liquid is caused by the increase in surface energy.

The second approach consists in condensing water from water-saturated air onto a plate comprising a hydrophilic line, and in analyzing the change in the size of the drops of condensation on the treated and nontreated parts.

This method makes it possible to comprehend the confinement of the drops within the line and the possibility of obtaining a continuous film at the level of this line with a constant volume of liquid (see photograph of FIG. 4).

Species displacement studies were carried out on the film of condensed water. To this effect, a potential difference of 10 Volts was applied between the ends of a condensation line 5 mm in length, and a saline solution of sodium chloride, at a concentration of 1 M, was placed at one end of the line. The appearance of an electric current of a few nanoAmperes on the line attests to the ionic displacement along the line.

The method according to the invention can also be used for obtaining biochips. In this case, the electrode used is a disk electrode, or a network of disk electrodes. The use of a single electrode comprising a plurality of points can also be envisioned.

The biochips obtained are, for example, intended for the immobilization of DNA, of proteins or of living cells.

The hydrophobic nature of the support prevents spreading of the drops containing, for example, the in-situ DNA synthesis solution. The contrast in hydrophobicity makes it possible to localize the synthesis reaction in the hydrophilic well, and thus makes it possible to increase the yield from the reaction for grafting the DNA onto the surface. It is therefore possible to produce spots of small diameter (typically up to 10 µm), which makes it possible to obtain high-density biochips.

Similarly, for the immobilization of cells, the size of the spots and, where appropriate, of the channels connecting them can be adjusted to the dimensions of the cells to be analyzed.

The present invention is illustrated by the following examples, to which it is not, however, limited.

EXAMPLE 1.1

Path of 10 Hydrophilic Spots on a Glass Substrate

The substrate consists of a glass grafted with a fluorosilane corresponding to the formula ($-Si-(CH_2)_2-(CF_2)_6-CF_3$).

The treatment is carried out in a glove bag supplied with nitrogen. The fluorinated substrate is in the form of a 2 cm-sided square. The substrate is placed at the bottom of an electrochemical cell, into which 5 ml of DMF, 0.5 mmol of $NBu_4BF_4$, 0.25 mmol of tritolylphosphine and a platinum wire (diameter: 0.25 mm) are introduced.

A platinum disk microelectrode (diameter 25 µm) is placed at a distance of 10 µm above the fluorinated substrate and parallel thereto. The microelectrode is controlled by a motorized platform allowing linear displacement along the horizontal plane. It is polarized at −2.8 Volts/SCE (saturated calomel electrode) for 30 seconds. The current is turned off and the microelectrode is moved 200 µm along the horizontal plane. It is again polarized for 30 seconds and the operation is repeated a further 8 times. The substrate is then withdrawn, rinsed successively with water and acetone, and dried for 30 minutes with compressed air. The spots are visualized by attachment of a film of polar liquid 10 (see FIG. 5). The diameter of each spot is 60 µm, and the center-to-center spacing is 200 µm.

EXAMPLE 2.1

Path of a Hydrophilic Line on a Silicon Substrate

The silicon substrate is coated with a polymer [branched $(CF_2)_n$] plasma-generated under a $C_4F_8$ atmosphere according to the method described in U.S. Pat. No. 5,501,893.

The treatment is carried out in a glove bag supplied with nitrogen. The fluorinated substrate is in the form of a 2 cm-sided square. The substrate is placed at the bottom of an electrochemical cell, into which 5 ml of DMF, 0.5 mmol of $NBu_4BF_4$, 0.25 mmol of tritolylphosphine (precursor) and a platinum wire (diameter: 0.25 mm) are introduced.

A gold disk microelectrode (diameter 100 µm) is placed at a distance of 20 µm above the disk and parallel thereto. The microelectrode is controlled by a motorized platform allowing linear displacement along the horizontal plane. It is polarized at −2.8 Volts/SCE and moved parallel to the surface at a speed of 10 µm/s$^{-1}$, so as to obtain in 1000 seconds a line 1 cm long and 250 µm thick. The substrate is withdrawn, rinsed successively with water and acetone and then dried for 30 minutes in an oven at 50° C. The line is visualized with the naked eye since the polymer is stripped off along the line and the mirror appearance of the silicon is observed.

EXAMPLE 2.2

The process is carried out according to the same protocol as in example 2.1, using an electrode made up of a gold band 1 cm long and 50 µm wide. The electrode is kept fixed at a distance of 20 µm from the surface of the substrate and is polarized for 30 seconds. A line 1 cm long and 100 µm thick is obtained.

EXAMPLE 2.3

The process is carried out according to the same protocol as in example 2.1, using an electrode made up of a fixed platinum wire (length: 2 cm, diameter: 250 µm) placed on the substrate and polarized for 30 seconds. A line 2 cm long and 500 µm thick is obtained.

EXAMPLE 2.4

The process is carried out according to the same protocol as in example 2.1, with a platinum disk electrode 25 µm in diameter, placed 8 µm from the substrate.

The substrate is a silicon plate silanized by reaction with $Cl_3Si-(CH_2)_2-(CF_2)_7-CF$, by adsorption and reaction of alkyltrichlorosilane on a substrate (Si/SiO$_2$), according to the experimental conditions described in the following publication: S. R. Wasserman, Y.-T. Tao, G. M. Whitesides *Langmuir*, 1989, 5, 1074-1087.

A line 1 cm long and 50 µm thick is obtained.

EXAMPLE 2.5

The process is carried out according to the same protocol as in example 2.1, with a platinum disk electrode 50 µm in diameter, placed 15 µm from the substrate.

The substrate is a glass plate coated with a conductive layer of metal oxide such as ITO (Indium Tin Oxide). This substrate is silanized by reaction with $Cl_3Si$—$(CH_2)_2$—$(CF_2)_7$—$CF_3$ according to the experimental conditions of example 2.4 (liquid-phase silanization) or those (gas-phase) described in the following publication: A. Hozumi, K. Ushiyama, H. Sugimura, O. Takai *Langmuir*, 1999, 15, 7600-7604.

The electrolytic solution used for the reduction of the surface is ethylenediamine containing 0.2 M of LiBF$_4$. The platinum disk electrode is polarized at a potential of –3 V relative to the Ag/AgCl system so as to locally generate solvated electrons. The electrode is moved at a speed of 10 µm/s so as to obtain a line 8 mm long and 150 µm thick.

EXAMPLE 2.6

The process is carried out according to the same protocol as in example 2.4.

The substrate is a gold plate grafted with fluorinated organic groups derived from diazonium salts (see the publication: Covalent Modification of Iron Surfaces by Electrochemical Reduction of Aryldiazonium Salts. A. Adenier, M. C. Bernard, B. Desbat, E. Cabet-Deliry, M. M. Chehimi, O. Fagebaume, J. Pinson and F. Podvorica, *J. Am. Chem. Soc.* 2001, 123, 4541-4549).

A line 5 mm long and 50 µm thick is obtained.

EXAMPLE 2.7

The process is carried out according to the same procedure as in example 2.4.

The substrate is a gold plate on which a layer of fluorinated thiols (HS—$(CH_2)_2$—$(CF_2)_n$—$CF_3$ with n=6, 8) is self-assembled, obtained according to the experimental conditions described in the following publication: C. D. Bain et al., *J. Am. Chem. Soc* 1989, 111, 321.

A line 5 mm long and 50 µm thick is obtained.

EXAMPLE 2.8

The process is carried out according to the same protocol as in example 2.1. The substrate is a glass plate textured with studs (side approximately 300 nm, height approximately 100 nm, spacing approximately 1 micron) and fluorinated —Si$(CH_3)_2$—$(CH_2)_2$—$(CF_2)_6$—$CF_3$ in order to confer on it superhydrophobic properties.

A line 1 cm long and 200 µm thick is obtained.

EXAMPLE 3

The difference in hydrophobicity is extolled by treating the modified surfaces with a solution consisting of a 30/70 mixture of H$_2$O$_2$/H$_2$SO$_4$ for 1 to 10 minutes.

The contact angle of a drop of water on the fluorinated glass surface goes from 106° to 96°. The contact angle of a drop of water on the reduced fluorinated glass surface goes from 76° to 30°.

EXAMPLE 4

The contact angles of three liquids: water, polar decanol and tricresyl phosphate (TCP) are measured on two types of modified hydrophobic substrates. The first substrate is made up of a hydrophobic glass silanized with a silane bearing the $(CH_2)_2(CF_2)_6CF_3$ group. The second substrate is made up of a "superhydrophobic" glass, the chemical composition of which is identical to that of the hydrophobic glass described above. The only difference is that this second substrate is textured with studs (side approximately 300 nm, height approximately 100 nm, spacing approximately 1 micron), thereby conferring superhydrophobic properties on said substrate.

The results obtained on control samples, and on sample reduced with sodium in liquid ammonia are reported in table 1 below:

TABLE 1

| | Type of hydrophobic substrate | | | | |
| --- | --- | --- | --- | --- | --- |
| | Superhydrophobic glass | | Hydrophobic glass | | |
| | Type of liquid | | | | |
| | TCP | Water | Decanol | TCP | Water |
| Angles on control samples | 108° | 143° | 66° | 78° | 110° |
| Angles on reduced samples | 27° | 55° | 32° | 36° | 76° |

The results obtained clearly illustrate the fact that the reducing treatment causes a considerable decrease in the contact angles and, consequently, an increase in the hydrophilic nature of the samples when they have undergone the electrochemical reduction.

The invention claimed is:

1. A method for producing at least one hydrophilic area (1) on a substrate (2) which comprises a chemically inert material (3) and of which one surface to be treated (4) is coated with a hydrophobic film, said hydrophobic film comprising fluorinated organic groups, the method comprising performing an electrochemical reduction of the surface to be treated (4) wherein:

the reduction is performed in an electrochemical cell (5) which is equipped with a reducing electrode (6) and a counterelectrode, and which contains an electrolytic solution (8) containing at least one solvent and a compound that is a precursor of a reducing agent, said compound being chosen so as to have a standard potential of less than –2.7 V relative to the saturated calomel electrode (SCE) and said compound corresponding to the general formula P(R$^1$R$^2$R$^3$), in which at least one of the radicals R$^1$, R$^2$ and R$^3$ represents a phenyl group bearing from 1 to 3 substituents, said compound being capable of forming an anion radical;

the reducing electrode (6) is placed, relative to the surface (4) of the substrate, such that said surface (4) is facing the usable surface (7) of the electrode (6), said surface (7) of the electrode (6) being the image of the area to be reduced; and the reducing electrode (6) is subjected to the formation potential of the reducing agent.

2. The method as claimed in claim 1, wherein the substituents of the radicals $R^1$, $R^2$ and $R^3$ are optionally substituted, linear or branched alkyl groups containing from 1 to 6 carbon atoms.

3. The method as claimed in claim 1, wherein $R^1$, $R^2$ and $R^3$ represent, independently of one another, a phenyl group bearing from 1 to 3 methyl groups.

4. The method as claimed in claim 3, wherein the compound that is a precursor of the reducing agent is tritolylphosphine.

5. The method as claimed in claim 1, wherein the electrolytic solution (8) comprises:
 a solvent selected from the group consisting of dimethylformamide (DMF), dimethyl sulfoxide (DMSO), hexamethylphosphorotriamide (HMPT), hexamethylphosphoramide (HMPA), acetonitrile, tetrahydrofuran (THF), ammonia, and primary amines; and
 a salt of $M^+A^-$ type in which $M^+$ is a nonreducible cation selected from the group consisting of $Li^+$, $Na^+$, $K^+$ and $NR_4^+$, wherein R is an alkyl radical, and in which $A^-$ is a nonreducible anion selected from the group consisting of $BF_4^-$, $B(C_6H_5)_4^-$, $CF_3CO_2^-$, $PF_6^-$, $(EtO)_2PO^-$, $NCCHCO_2Et^-$, $AcO^-$, $SCN^-$, $CH_3CH_2CH_2CH(NH_2)CO_2^-$, $ClO_4^-$, $Br^-$, $Cl^-$, $I^-$ and $SO_4^{2-}$.

6. The method as claimed in claim 1, wherein the fluorinated organic groups are selected from the group consisting of linear fluoroalkyl groups, branched fluoroalkyl groups, fluoroalkylthiol groups and fluorophenyl groups.

7. The method as claimed in claim 6, wherein the fluorinated organic groups are perfluoro groups.

8. The method as claimed in claim 1, wherein, in the fluorinated organic groups comprising the hydrophobic film, the F/H ratio is greater than or equal to 1 before reduction.

9. The method as claimed in claim 1, wherein the chemically inert material (3) forming the substrate (2) is selected from the group consisting of glass, silica, silicon, alumina, metal oxides, metals, and an insulating material.

10. The method as claimed in claim 9, wherein the chemically inert material (3) is a polycarbonate coated with a conductive or semiconductive film.

11. The method as claimed claim 1, wherein the surface (7) of the reducing electrode (6) is a continuous surface.

12. The method as claimed in claim 11, wherein the surface (7) of the reducing electrode (6) is in the shape of a disk.

13. The method as claimed in claim 12, wherein the distance between the surface (7) of the reducing electrode (6) and the surface to be treated (4) is between 0 and 2 times the radius of the disk.

14. The method as claimed in claim 11, wherein the surface (7) of the reducing electrode (6) is in the shape of a band.

15. The method as claimed in claim 14, wherein the distance between the surface (7) of the reducing electrode (6) and the surface to be treated (4) is between 0 and 2 times the width of the band.

16. The method as claimed in claim 11, wherein the surface (7) of the reducing electrode (6) is a pad on which is inscribed the pattern to be etched.

17. The method as claimed in claim 1, wherein the surface (7) of the reducing electrode (6) is a discontinuous surface.

18. The method as claimed in claim 17, wherein the surface (7) of the reducing electrode (6) is made up of a plurality of points.

\* \* \* \* \*